Figure 1:
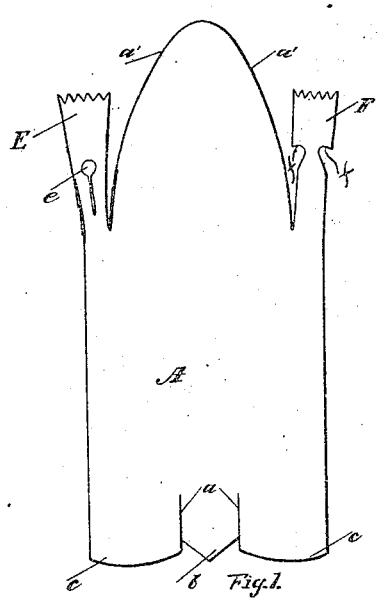

F. CURTIN & W. C. SHIELDS.
MOCCASIN.
APPLICATION FILED MAR. 18, 1908.

1,052,133.

Patented Feb. 4, 1913.

Witnesses
C. A. Zardell
E. T. De Giorgi

Inventors
FRANK CURTIN
WILLIAM C. SHIELDS
By Risley & Love
Attorneys

UNITED STATES PATENT OFFICE.

FRANK CURTIN, OF GLOVERSVILLE, AND WILLIAM C. SHIELDS, OF BOMBAY, NEW YORK, ASSIGNORS TO WILLIAM C. SHIELDS AND JOHN J. SHIELDS, DOING BUSINESS AS PARTNERSHIP OF SHIELDS BROTHERS, OF BOMBAY, NEW YORK.

MOCCASIN.

1,052,133.   Specification of Letters Patent.   Patented Feb. 4, 1913.

Application filed March 18, 1908. Serial No. 421,793.

*To all whom it may concern:*

Be it known that we, FRANK CURTIN, a citizen of the United States, residing at Gloversville, Fulton county, New York, and WILLIAM C. SHIELDS, a citizen of the United States, residing at Bombay, in the county of Franklin and State of New York, have invented certain new and useful Improvements in Moccasins, of which the following is a specification, reference being had therein to the accompanying drawing.

Our invention relates to an improved moccasin, and we declare the following is a full, clear, concise and exact description thereof, sufficient to enable one skilled in the art to make and use the same, reference being had to the accompanying drawings in which like reference characters refer to like parts throughout.

While we specify the invention as being related to an improved moccasin and illustrate it in that form of product, we do not mean to exclude other articles which may be made in the same manner or comprise any or all the features of the invention, preferring to show the invention in that form of product in the making of which we have employed it particularly.

The invention includes the method which we employ in shaping the blanks or pieces which are cut to form the moccasin, in treating or forming them in preparation for being united and in bringing and holding them in proper relation while the sewing and uniting operation takes place, as well as in the application of a certain stitch to gather and hold the edges united in their proper relation.

Figure 2:
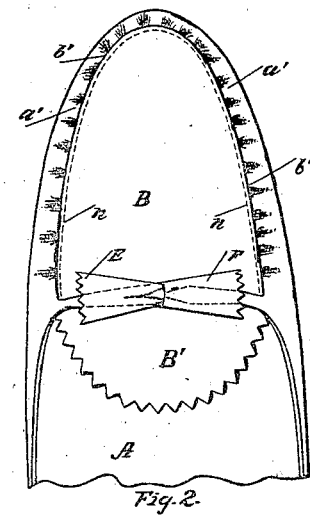
Figure 3:
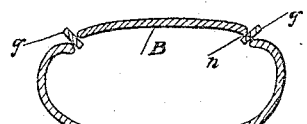
Figure 4:
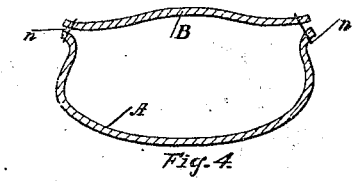
Figure 5:
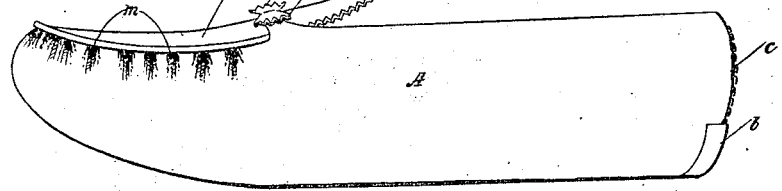
Figure 6:
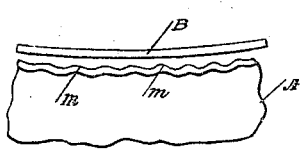
Figure 7:
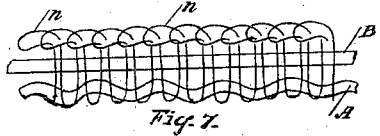

In the drawings Figure 1 is a view of a blank cut for the bottom part of the moccasin and showing certain features of the invention. Fig. 2 is a top view of the forward part of a finished moccasin. Fig. 3 is a section view of the pieces in Fig. 2 but showing how they may be united with a welt between them. Fig. 4 is a like view showing how they may be brought together, preferably without a welt. Fig. 5 is a side view of a moccasin made as set forth herein, while Fig. 6 shows a portion of the moccasin with the edges of the blanks slightly separated and showing the condition of each when in place for stitching. Fig. 7 shows the kind of stitch which we use.

Referring particularly now to Fig. 1, A is a blank cut from suitable material to be formed for the sole and sides of the moccasin. The heel end has two slits $a$, leaving middle flap $b$ and side flaps $c$. In making the moccasin the edges of the blank are turned up to serve as sides of the moccasin, the edges of the side flaps being brought together and the middle flap being brought up and secured outside them, as seen in Fig. 5. The forward or toe part of the blank is also turned up to meet the top blank and inclose the forward part of the foot, the inner surface at the edges $a'$, $a'$, of the forward part being properly shaved or trimmed to fit them for being sewed to the upper blank.

In cutting the blank A, two tags E and F are left attached to the blank, the former having eye $e$ large enough for the insertion of the free end of the other tag therethrough and the latter having shoulders $f$, $f$, to engage with the edges of the eye $e$ and hold the two tags together, as shown in Fig. 2, in the form of a tie across the top of the foot, the tags being cut with slightly enlarged and ornamental ends.

B is the top blank of the moccasin, being of the general form shown in Fig. 2, having its edges $b'$ suitably prepared for stitching and its free end suitably extended and finished to reach a suitable distance up and back along the top of the foot as shown by B'. The blanks being thus properly cut and prepared are ready for the operation of stitching to unite the edges $a'$, $a'$ to edges $b'$, $b'$, and it is apparent that the fulness of the former edge must be gathered within the limits of the latter edge and when thus gathered the two must, in some manner, be held in proper place until they can be sewed. It is manifest that this would be a slow and expensive proceeding if attempted by hand and could not be done with such exact and uniform disposition of the fullness and placing of the stitches that the result would be the same in a series of moccasins or that the product would be symmetrical, either as regards a single article along both sides of the foot or as regards a number of articles with relation to each other and in comparison. Furthermore, the stitches that would necessarily be made in the hand operation would consist of thread passed to and fro, through the blanks, each drawn tight to secure the edges close, and consequently unyieldingly, together, whereas it is desirable that, while the stitches hold the blanks firmly, there be a certain degree of yield or give in the stitches so that the moccasin shall be pliable and comfortable, and the strain of wear be taken up by yield of the stitches and not by their strain on the leather.

We have provided means whereby we are able to unite the two blanks, at such edges, by stitches n which we term single-thread elastic chain with waxed thread. The formation of this stitch is not itself new, being such as has been made by well-known machines in other kinds of work, but its use in this connection, in so far as we have been able to learn, has never before been attempted. While one advantage is that it can be made by machine and is therefore perfectly accurate and the stitches all alike and the product regular and symmetrical, another distinct advantage is that there is a certain amount of yield in the stitch itself so that the moccasin bends more readily in the movements of the wearer than is possible in any hand-made product. The thread being waxed or otherwise suitably prepared holds the several stitches firmly in place in the fabric, preventing the thread from slipping from one stitch to another to allow the seam to open at any points and be drawn too tight at others. Such stitches are shown in an enlarged view in Fig. 7. By the word yielding as used in the claims we mean a stitch of the character produced by a chain-stitch machine as distinguished from stitches drawn tight by hand and consequently unyielding, the character of stitch resulting from the sewing of the moccasin by hand. Again, the creasing of the edge of the lower blank where it is sewed to the edge of the upper one is a very important feature in producing good work and it is essential that the fullness should be properly gathered and be done the same in each moccasin. The means which we have devised is mechanical, operating according to its adjustment, synchronously with the mechanisms which form the stitches, gathering the edge of the lower blank in proper place and in a series of folds or tucks m of proper size and arrangement. Such arrangement is indicated in Fig. 6, Fig. 5 showing the creases in the finished product.

By referring to Figs. 2, 5, and 6, it will be noticed that folds or tucks m vary in size in constant ratio from the instep portion toward the toe portion of moccasin, the shorter or narrower tucks being adjacent the instep portion. This variableness of tuck adapts the blanks to be united by sewing in symmetrical manner, as well as to produce a grace and beauty of form.

In the operation of the means we have referred to the workman brings the two blanks to the sewing machine and feeds them to the stitching mechanism. During the operation of stitching, other means in the mechanism we have devised coöperate with the stitching parts to feed the sole blank thereto with the fullness of its edge gathered at proper times and places and in proper degree, all as prearranged, so that the parts when they come from the machine are united with the specified stitches in regular arrangement of their meeting edges, in the product as specified and as indicated in the drawings. Evidently the greater degree of fullness of the lower or sole blank will be at the forward parts of the moccasin and the minimum degree at the sides where it may be practically nothing. The operator controls the mechanism so that, starting at one end, say with no fullness, the lower blank is crowded more and more as the stitches are made until the maximum degree of pressure is reached, after which the pressure is relaxed as the opposite end of the seam is approached. This regulation of the feeding or crowding is as pre-determined in order to produce the feature of the product of which we have spoken, such as form, symmetry and regularity of finish and which distinguish the product. The fullness of the lower blank may be disposed as the operator determines with such degree on either side of the foot as may be desired, and such disposition of the fullness of the lower blank as may produce the most desirable article. In Fig. 3 we have shown these parts as united with a welt o between them, while it is seen in Fig. 4 that they can be sewed without a welt, the operation being the same in each case and producing substantially similar results.

It will thus be seen that we have produced a machine-made moccasin, the blanks being cut by dies and being sewed together by machine with perfect regularity of operations and effects, by reason of the style of blanks and the operation of sewing, making the moccasin durable and pliable and producing an article of superior economy, beauty and strength.

Having described our invention, what we claim as new and desire to secure by Letters Patent, is:

1. A moccasin consisting of two blanks united at corresponding edges by a succession of even yielding stitches, the edges being of different lengths in the blanks, but of the same length in the finished product, the fullness of one edge being gathered within the length of the other edge with a regular increase of fullness from one side to the toe-tip, and with like decrease from the tip to the other side.

2. A moccasin formed of two blanks having edges of different lengths united within the length of the shorter edge and togeone of the blanks, one tag having a slit and the other a shoulder whereby they may engage each other and form a tie.

3. A moccasin consisting of two blanks, one being cut to cover the bottom and sides of the foot and the other to cover the upper front part of the foot, the bottom blank being formed with two tags, one slotted and the other with a shoulder adapted to engage the slotted member whereby to secure the tags together to form a tie on the top of the moccasin.

4. A moccasin consisting of an upper and a lower blank, the lower blank being formed with two tags, one slotted and the other with a shoulder adapted to engage the slotted tag whereby to secure the tags together, said lower blank being of a size to be upturned and cover the sides of the foot, the edges being joined by the said tags on top of the foot, the two blanks being united at the forward part of the lower blank.

5. A new article of manufacture consisting of a moccasin formed of two blanks, the one being cut from a flat piece of leather or the like having at one end a centrally disposed projecting portion of curved form adapted to be turned up to cover the sole and sides of the foot, and having on each side thereof a forwardly projecting tag, the tags being cut to engage each other when the sides of the blanks are upturned to form a tie on top of the foot, the said blank having at the other end two longitudinal parallel cuts whereby to provide an upturned flap at the heel and a flap on each side to be connected to each other and to the former flap whereby to form the heel of the moccasin, and an upper blank cut on a curve similar to the projecting portion of the first-mentioned blank and adapted to form the top of the moccasin, the two blanks being joined along the said curved portions.

In testimony whereof we affix our signatures in presence of two witnesses.

FRANK CURTIN.
WILLIAM C. SHIELDS.

Witnesses to the signature of Frank Curtin:
    CHAS. N. HARRIS,
    FRED H. HARRIS.

Witnesses to the signature of William C. Shields:
    RAOUL BOURDON,
    B. E. MOORE.